United States Patent [19]
Karlsson

[11] 3,872,722
[45] Mar. 25, 1975

[54] LOW DRAIN PULSE GENERATOR

[75] Inventor: Stig Ingvar Karlsson, Karlskrona, Sweden

[73] Assignee: AB Svensk Varmematning C.B.—System, Bromma, Sweden

[22] Filed: Dec. 3, 1973

[21] Appl. No.: 421,107

Related U.S. Application Data

[63] Continuation-in-part of Ser. No. 256,925, May 25, 1972, Pat. No. 3,812,713.

[30] Foreign Application Priority Data

Dec. 8, 1972 Sweden............................ 16037/72

[52] U.S. Cl. ............................................. 73/193 R
[51] Int. Cl. ......................................... G01k 17/10
[58] Field of Search............... 73/193 R; 235/151.34

[56] References Cited
UNITED STATES PATENTS
3,617,713  11/1971  Karlsson ............................ 73/193
3,639,737  2/1972  McKee................................ 73/193

*Primary Examiner*—Herbert Goldstein
*Attorney, Agent, or Firm*—Hane, Baxley & Spiecens

[57]  ABSTRACT

A low drain pulse generator which can be used in, for example, apparatus for measuring temperature differences in a flowing fluid includes a pair of monostable flip-flops connected in cascade to a mechanically actuated switch which yield sequential pulses when the switch is actuated. The outputs of the monostable flip-flops are connected to inputs of a pulse generating circuit which transmits a bipolar pulse signal to its output upon receipt of the sequential pulses from the monostable flip-flops.

1 Claim, 2 Drawing Figures

LOW DRAIN PULSE GENERATOR

The present invention pertains to low drain pulse generators which can be used with apparatus for reducing the load time in arrangements for measuring temperature difference and quantity of heat and is a continuation-in-part of my copending application Ser. No. 256,925, filed May 25, 1973 now U.S. Pat. No. 3,812,713.

According to the method described in the copending application, the load time in an apparatus for measuring the quantity of heat is reduced by feeding current pulses to the temperature dependent resistors included in the arrangement. A disadvantage with the embodiment of the apparatus for carrying out such method described in the copending application is, however, that such apparatus must be connected to the external line voltage which to a certain extent limits its range of application to such sites where line voltage can be obtained.

An object of the present invention is to provide a pulse generator for use in apparatus for carrying out the method which is described in the copending application and by means of which it is possible to connect a feeding voltage source which is independent of the line, for example, a battery.

Another object of the invention is to provide a pulse generator which has a low drain and can be supplied by a battery.

Figure 1:
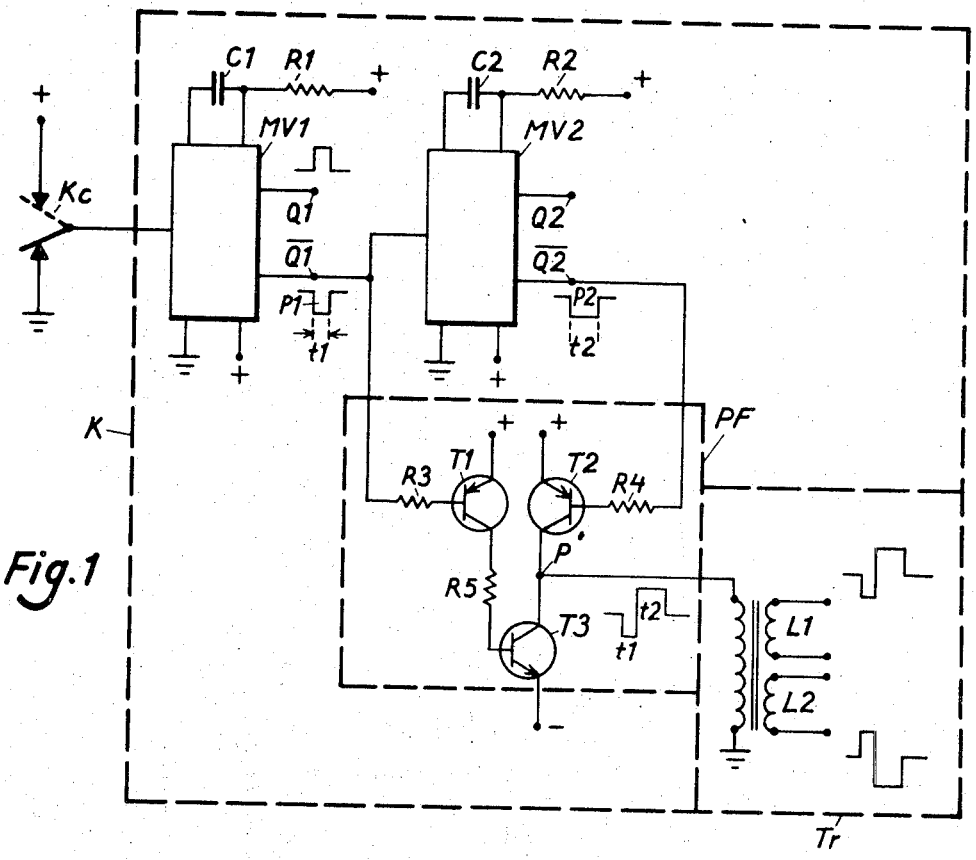
Figure 2:
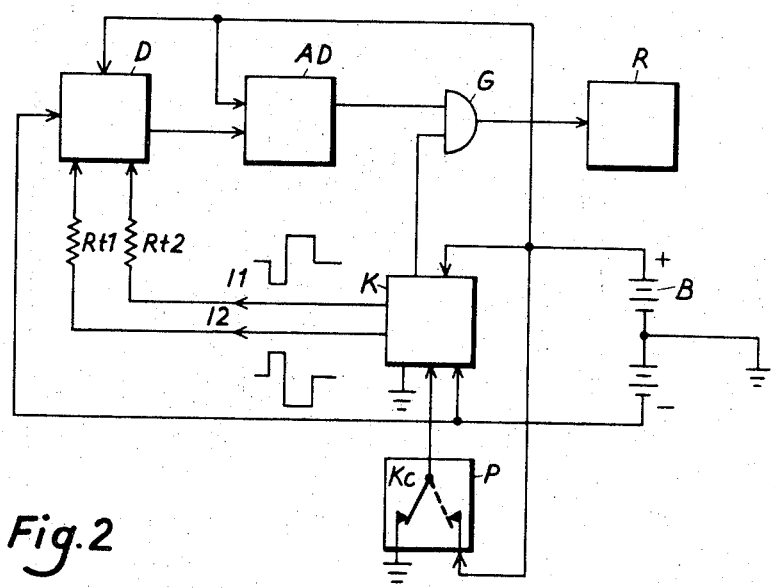

The invention, the characteristics of which appear from the appended claims, will be described more fully with reference to the accompanying drawing in which:

FIG. 1 shows a circuit diagram of an embodiment of the apparatus according to the present invention; and FIG. 2 shows a block diagram of an apparatus for measuring a quantity of heat according to the copending application having an embodiment in accordance with the present invention.

FIG. 1 shows a circuit diagram for converting mechanical switch operations to electrical pulse signals. In FIG. 1, K indicates the units lying within the dashed area and this unit K corresponds to the pulse generating circuit K which is indicated in FIG. 1 of the copending application, and Kc indicates the contact which is included in the volumeter P according to the same Figure. The pulse generating circuit K has, according to the present invention, been given a new design to enable a battery or another D.C. voltage source to be connected to it, as will appear more in detail according to FIG. 2. The pulse generating circuit K includes a first and a second monostable flip-flop MV1 and MV2, respectively, which preferably are of the integrated circuit design (so-called CMOS-type). Connected to each flip-flop in a known manner are the timing circuits R1, C1 and R2, C2, respectively, the resistors R1 and R2 being connected to the positive pole of the battery. The trigger input of the flip-flop MV1 is connected to the output of the contact Kc for obtaining a trigger signal when a certain quantity of the flowing medium has been measured by the volumeter P as described in the copending patent application. In particular, it can be said that whenever a given quantity of fluid is measured the contact Kc is operated. Each flip-flop has an inverting and non-inverting output $\overline{Q1}$, $\overline{Q2}$ and Q1, Q2, respectively. In the present embodiment, the output Q2 of the second flip-flop MV2 is connected to a second input of the gate G as it appears from FIG. 2 in order to deliver a pulse to this corresponding to the gating pulse mentioned in the copending application. The inverting output $\overline{Q1}$ of the flip-flop MV1 is connected to the trigger input of the flip-flop MV2, this flip-flop being thus triggered at the returning to the zero-position of the pulse which appears across the output $\overline{Q1}$, when the flip-flop MV1 is triggered. Obviously, the pulse duration $t1$ and $t2$, respectively, can be varied by means of changing the time constants of the associated time circuits R1, C1 and R2, C2, respectively.

The inverting outputs of the two flip-flops MV1 and MV2 are connected to each input of a pulse forming circuit PF. This circuit includes the transistors T1 and T2 and associated base resistors R3 and R4, respectively. The emitter of these transistors are connected to the positive pole of the battery in the case that the transistors are of PNP type as indicated in FIG. 1. The collector of the transistor T1 is via a resistor R5 connected to the base of a third transistor T3 of NPN type and the collector of the transistor T2 is directly connected to the collector of this transistor. The connection point P' forms the output of the pulse generating circuit PF. A pulse transformer Tr, having the same design as the transformer Tr of FIG. 3 in the copending application, has its primary winding connected to the output of the pulse generating circuit PF and to ground potential. As in the embodiment according to the copending application, this transformer has two secondary windings L1 and L2 which are connected to the respective ones of the temperature dependent resistors.

When the flip-flop MV1 is triggered by the contact Kc, the outputs Q1 and $\overline{Q1}$ are activated, so that across each a pulse appears according to the Figure. At the end of the inverted pulse, the flip-flop MV2 is triggered, so that across the outputs Q2 and $\overline{Q2}$ pulses according to FIG. 1 appear. When the pulse P1 with the time duration $t1$ appears across the input of the pulse generating circuit PF, the transistor T1 conducts after having been blocked (as is transistor T3) and the potential of the output P' is negative (equal to the negative potential of the battery). This condition remains during the time interval $t1$. When the pulse P1 ceases, the pulse P2 across the output $\overline{Q2}$ of the flip-flop MV2 will appear and the transistor T1 is blocked as is the transistor T3. The transistor T2 will, however, conduct, with the output of the pulse generating circuit assuming the positive potential of the battery. Thus, across this output two consecutive pulses having opposite polarities are obtained, in the following called the pre-pulse and the measuring-pulse, respectively, the measuring-pulse starting at the same moment as the gating pulse to the gate G which pulse appears across the output Q2. Thus, there is obtained a pre-pulse having the opposite polarity relatively to the measuring pulse through the transformer and the temperature dependent resistors, this pre-pulse will pre-magnetize the transformer. This insures that the mean value of the magnetizing current is equal to zero and each of the output pulses from the transformer Tr obtains a mean value which is independent of the magnetizing current. Thus, no current consumption occurs in the transformer between the measurements which makes the method suitable for battery operation. The pre-pulse can be chosen, so that its voltage-time-integral is equal to the voltage-time-integral of the measuring pulse, for example, twice the voltage value but half as long time duration.

In FIG. 2, the connection of the battery to the pulse generating circuit K and to the difference circuit D, analog-digital converter AD and the volumeter P is shown. The same designations as in the copending application have been used. The battery B is thus used as a supply voltage source to these units like the unit SD was used in the embodiment according to the copending application (see FIG. 1 thereof). In the present embodiment, the contact Kc in the volumeter P is, furthermore, connected to the battery B. The contact Kc can herewith consist of a transistor stage which is controlled to its conducting state by the volumeter P.

By using monostable flip-flops of integrated design according to the above, the pulse generating circuit K can be dimensioned for a quiescent current which is practically zero (in the order of $nA$). The difference circuit D, the analog-digital converter AD and the gate G are already in the embodiment according to the copending application constructed, so that they do not have any quiescent current. With an electronic counter R consisting of frequency dividers of the integrated CMOS type the entire measurement apparatus consumes quiescent current in the order of $nA$.

More particularly, the role of the pulse generator K in a temperatuare measuring system is described with reference to FIG. 2.

In FIG. 2, P indicates a rotating volumeter having a contact that is closed for a certain angle of the rotating volumeter, corresponding to the fact that a certain quantity of the flowing medium has passed the volumeter. The contact K of the volumeter is connected to a pulse generating circuit K, one of the three outputs of which is connected to one of the inputs of a gate G, for example an AND-gate. The other two outputs are connected to two temperature sensing bodies consisting of temperature dependent resistors $Rt1$, $Rt2$. To the pulse generating circuit receives the (+) and (−) voltages from battery B. These two direct current voltages are supplied to the pulse generator circuit K and to the analog-digital converter AD as a bias voltage. The pulse generator or circuit K delivers current pulse $I1$ and $I2$ to each of the resistors $Rt1$, $Rt2$, of a certain duration and preferably having mutually an opposite polarity. The current pulses $I1$ and $I2$ are delivered simultaneously and at the same instant as a voltage pulse is delivered to the gate G. These pulses are delivered by the pulse generating circuit when a pulse from the volumeter indicates that a certain quantity of the flowing medium has passed.

The pulses to the resistors $Rt1$ and $Rt2$ give rise to pulse shaped currents whose amplitudes depend on the temperature of the surrounding medium. The difference meter circuit D, connected to the resistors $Rt1$, $Rt2$ forms the difference value of the currents $I1$, $I2$ and this value is fed to the analog-digital converter AD which converts, in accordance with the previously known arrangement, the analog difference value $I2-I1$ to a pulse train during a time interval that is at most equal to the pulse duration of the voltage pulses $U1$, $U2$. The pulse train is fed to the other input of the gate G which opens at the same moment as the pulse from the pulse generating circuit activates one of its inputs. The electronic counter R sums up the number of pulses from the gate G which number is equal to the number of pulses obtained from the converter AD during the measuring time which is determined by the duration of the time gate G is open. This number can then be converted to a temperature reading.

While the pulse generator K has been described in the environment of a device for measuring the thermal properties of a flowing fluid, it should be realized that such pulse generators can be used whenever it is desired to convert a mechanical switch action to an electrical pulse signal, particularly when such pulse generators must operate from sources such as storage batteries which demand small current drains.

What is claimed is:

1. An apparatus for measuring the thermal properties of a flowing fluid comprising: temperature dependent elements for generating, in response to a voltage pulse applied to each of said elements; first and second electric currents which are proportional to the temperature at first and second regions of said flowing fluid; differential means for generating the difference current of the first and second electric currents which represents the temperature difference between said two regions; analog-to-digital conversion means for converting said difference current into a first pulse train with a pulse repetition rate proportional to the amplitude of said difference current; a volumeter means for measuring a predetermined volume of the flowing fluid and including a first means which is activated each time a predetermined volume has been measured; pulse generating means (K) controlled by said first means in said volumeter means for transmitting said voltage pulse to said temperature dependent elements for each volume indication; a gating means having a first input connected to said analog-to-digital conversion means and a second input connected to an output of said pulse generating means; a D.C. voltage source connected as a supply voltage to said pulse generating means; and said pulse generating means including a first and a second monostable flip-flip each of which has a trigger input and an inverting and a non-inverting output, the trigger input of said first flip-flop being connected to the output of said volumeter means and the trigger input of said second flip-flop being connected to the inverting output of said first flip-flop, the non-inverting output of said first flip-flop being connected to the second input of said gating means, a pulse generating circuit for generating a voltage pulse having a predetermined duration and having two inputs and an output, said inputs each being connected to the same outputs of each of said flip-flops, and output transformer means, connected to the output of said pulse generating circuit, for transmitting to each of said temperature dependent elements the voltage pulse generated by said pulse generating circuit.

* * * * *